United States Patent [19]

Sato

[11] 4,178,477
[45] Dec. 11, 1979

[54] TELEPHONE RECORDER MECHANICAL ACTUATOR

[75] Inventor: Masaaki Sato, Hachioji, Japan

[73] Assignee: Olympus Optical Company Ltd., Tokyo, Japan

[21] Appl. No.: 890,685

[22] Filed: Mar. 27, 1978

[30] Foreign Application Priority Data

Mar. 25, 1977 [JP] Japan ................................ 52-32986
Mar. 25, 1977 [JP] Japan ................................ 52-32987
Mar. 25, 1977 [JP] Japan ................................ 52-32988

[51] Int. Cl.² .................... H04M 1/64; G11B 31/00
[52] U.S. Cl. .......................... 179/6 R; 179/100.11; 179/147; 360/105
[58] Field of Search ............ 179/6 AC, 6 R, 100.11, 179/147; 360/105

[56] References Cited

U.S. PATENT DOCUMENTS

| 2,512,933 | 6/1950 | Hampton et al. | 179/147 X |
| 2,703,821 | 3/1955 | Kopp et al. | 179/6 AC |
| 3,376,390 | 4/1966 | Hashimoto | 179/6 AC |
| 3,557,312 | 1/1971 | Vogelman et al. | 179/6 AC |
| 3,560,666 | 2/1971 | Bookman | 179/100.11 |
| 3,721,765 | 3/1973 | Ho | 179/6 R |
| 3,937,893 | 2/1976 | Muller et al. | 179/6 R |
| 4,037,053 | 7/1977 | Mueller | 179/100.11 |
| 4,117,266 | 9/1978 | Williams | 179/6 R |

*Primary Examiner*—Bernard Konick
*Assistant Examiner*—Donald McElheny, Jr.
*Attorney, Agent, or Firm*—Toren, McGeady and Stanger

[57] ABSTRACT

A telephone recording device comprises a recording head provided in a movable member moved in accordance with taking up and down of a handset of a telephone, the recording head being set on the recording side when the handset is removed and being reset when the handset is replaced.

8 Claims, 18 Drawing Figures

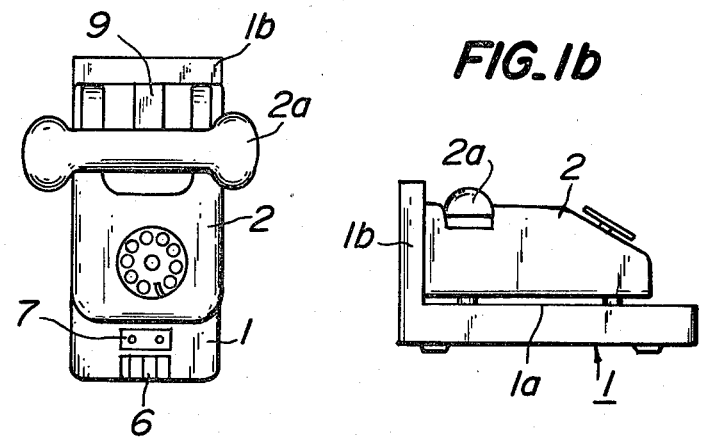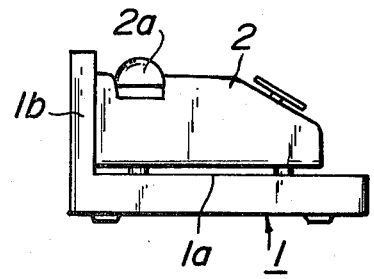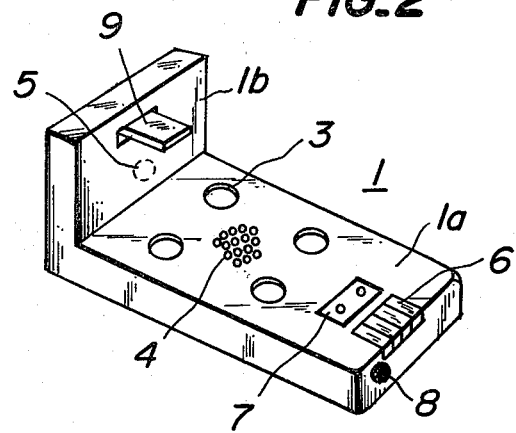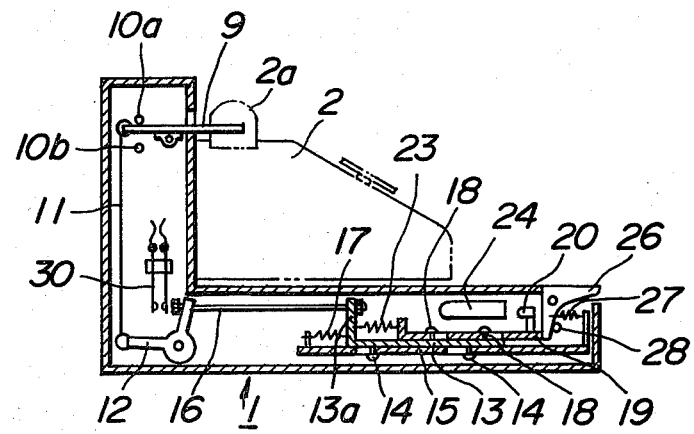

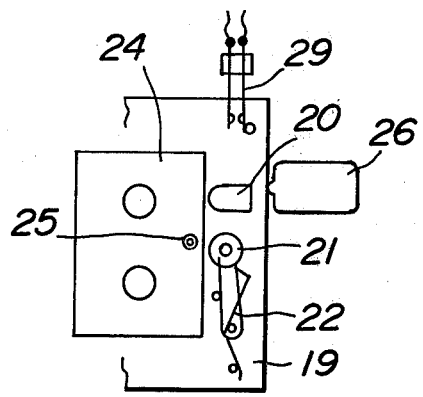
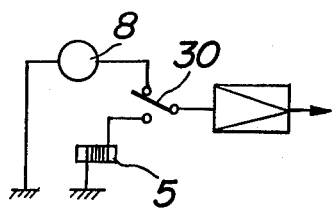
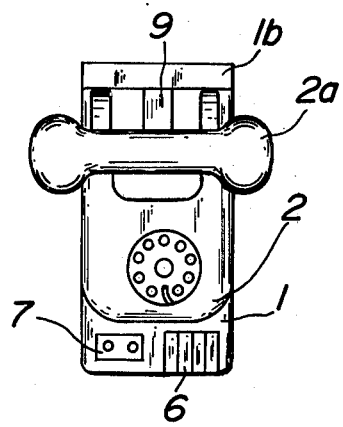
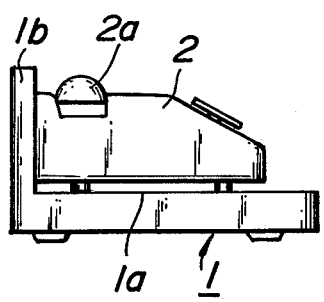
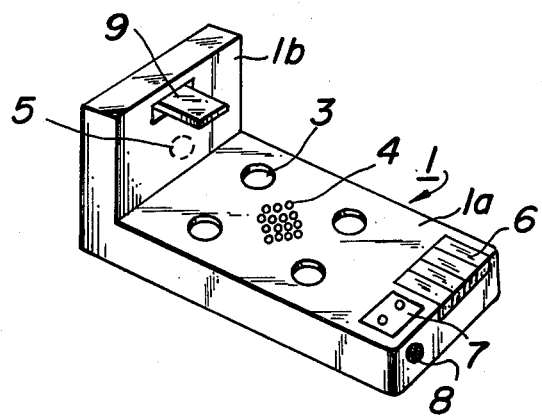

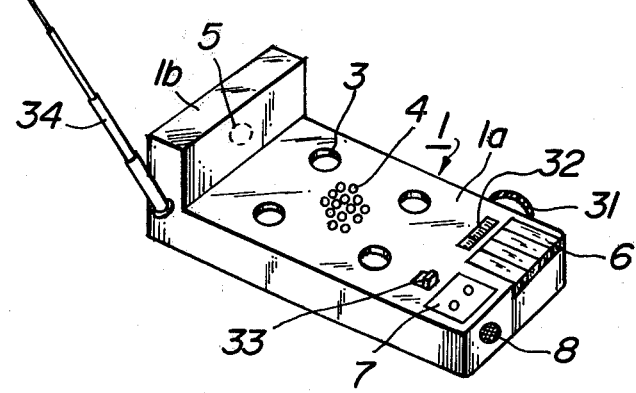
FIG._11
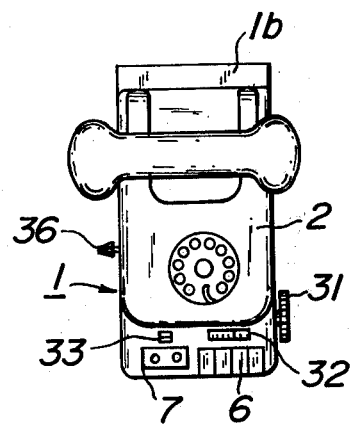
FIG._12a
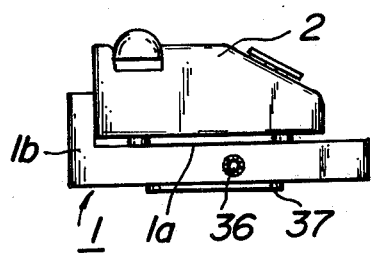
FIG._12b
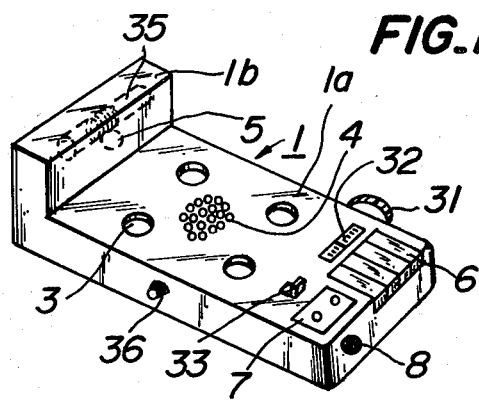
FIG._13
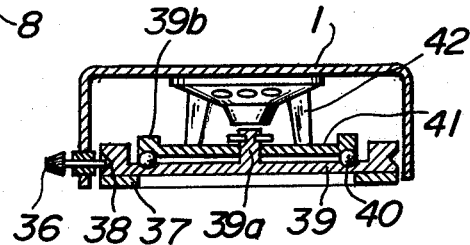
FIG._14

TELEPHONE RECORDER MECHANICAL ACTUATOR

BACKGROUND OF THE INVENTION

1. Field of the Invention

The present invention relates to a telephone recording device for automatically recording the contents of a telephone interlocking with telephone operation.

2. Description of the Prior Art

Heretofore, in order to record the contents of a telephone, a telephone pickup is prepared, one end of this pickup is secured to the telephone and the other end thereof is connected to a tape recorder, and under this state the recording is carried out.

In case of such telephone recording, a tape recorder is manually set to record every telephone call, and the tape recorder is manually reset every time a the telephone call finishes. However, it is possible to forget to set or reset the recorder. Therefore, important telephone calls may be forgotten to be recorded or a tape may uselessely be rotated after the telephone is finished. As a result the desired recording in the tape is difficult to find.

Such telephone recording, in addition, requires a wide space, so that at the place where no large space can be afforded such as a business desk which requires a large space for document handling cannot be used such telephone. If the tape recorder is placed near the telephone, it is troublesome to operate the telephone, and some times, the tape recorder is erroneously dropped from the desk.

SUMMARY OF THE INVENTION

An object of the present invention is to eliminate the above disadvantages of the conventional device.

Another object of the present invention is to provide a telephone recording device in which the content of the telephone is automatically recorded by interlocking with telephone operation.

A further object of the present invention is to provide a telephone recording device which can record independently as a tape recorder.

Further object of the present invention is to provide a telephone recording device in which a tape recorder with a radio is incorporated by using a tape recorder case simultaneously as a telephone stand.

According to the present invention, a telephone recording device comprises a recording head provided in a movable member moved in accordance with removal and replacement of a handset of a telephone, the recording head being set on the recording side when the handset is taken up and being reset when the handset is taken down. Under the state of taking down the handset the movable member is able to move by external operation to make the recording head settable on the recording side. The outputs of the telephone and a recording microphone provided in recording device are selectively supplied to a recording circuit. This automatically prevents the disadvantages of the prior device.

BRIEF DESCRIPTION OF THE DRAWINGS

FIGS 1a and 1b are a plan view and a side view showing one embodiment of the present invention;

FIG. 2 is a perspective view of the same embodiment;

FIG. 3 is a cross-sectional view showing a recording operation mechanism of the same embodiment;

FIG. 4 is a front view of the movable plate used in the recording operation mechanism;

FIG. 5 is a switching diagram of the recording microphone and the pickup coil of the same recording operation mechanism;

FIGS. 6 to 8 show second embodiment of the present invention;

FIGS. 10 and 11 show fourth embodiment of the present invention; and

FIGS. 12 to 14 show fifth embodiment of the present invention.

DESCRIPTION OF THE PREFERRED EMBODIMENT

Figure 8:
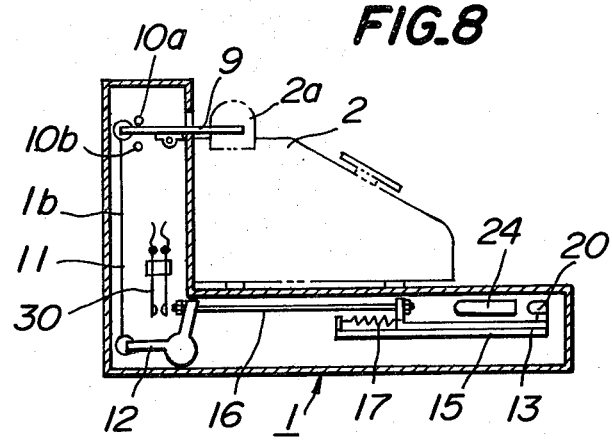

Referring to FIGS. 1 to 3 one embodiment of a telephone recording device according to the present invention is shown. In FIGS. 1a and 1b reference numeral 1 is a thinly formed tape recorder case formed on a plateform portion 1a of a telephone 2 with a flat upper surface. On this platform portion 1a are formed recesses 3 corresponding to legs of the telephone ad openings 4 for a speaker. One end portion of the case 1 extends slightly in front of the telephone. The extended portion carries the operation buttons 6 of the tape recorder body, a cassette chamber 7 and a recording microphone 8, respectively. The operation buttons 6 and the cassette chamber 7 are positioned as shown in FIGS. 6 and 7. The other end portion of the case terminates in a standing portion 1b which contacts the rear portion of the telephone 2. This standing portion 1b is provided with a telephone pickup coil 5 in the portion contacting the telephone so as to pickup the signals representing the conversation transmitted and received by the telephone. It is a matter of course that the telephone pickup coil 5 is electrically connected to the tape recorder body (not shown).

On the other hand, the case 1 contains a recording recording and stopping mechanism for operating the tape recorder portion by interlocking it with the telephone operation as shown in FIG. 3. That is, a contact piece 9 projects from the standing portion 1b of the case 1. This contact piece 9 is rotatably pivoted at the center portion thereof, arranged at the hanging portion of a handset 2a of the telephone 2 at the end portion thereof and rotated in accordance with the presence of the handset 2a. In this case, stoppers 10a and 10b limit the rotating range of the contact piece 9. The contact piece 9 is coupled to one end of a crank piece 12 through a coupling lever 11. The crank piece 12 is rotatably pivoted at the center portion thereof and rotated by interlocking with said contact piece 9.

A first movable plate 13 mounted on a chassis 15 through a guide pin 14 is movable in both directions as illustrated. One end portion of the movable plate 13 is formed into a standing portion 13a which is coupled to the other end of the crank piece 12 through an operation lever 16. A spring biases the movable plate 13 to the left direction as illustrated, so as to rotate and push the crank piece 12 and the contact piece 9 in the counterclockwise direction through the operation lever 16. When the handset 2a is placed on the telephone 2, the weight of the handset 2a causes the movable plate 13 to be moved in the right direction as illustrated against the biasing force of the spring 17 through the operation lever 16 by the rotating force in the clockwise direction of the contact piece 9 and crank piece 12 FIG. 3 shows this state. In this case, the weight of the handset 2a of the telephone 2 is sufficiently large as compared with the biasing force of the spring 17 so as to rotate the contact piece 9 and the crank piece 12 and to move the movable plate 13 through the operation lever 16.

On the movable plate 13 a second movable plate 19 is movable to the left as illustrated along a guide pin 18. This movable plate 19 is provided with a recording head 20 and a pinch roller 21 as shown in FIG. 4. A spring 22 applies optimum pressure to the pinch roller 21. A spring 23 biases the plate 19 to the right in FIG. 3, so as to separate the head 20 from the tape surface of a cassette 24 in the cassette chamber 7 and the pinch roller 21 from a capstan 25, respectively, and to maintain them in the stopped non-recordng state.

A recording button 25 of the operation button 6 is provided by attaching to the movable plate 19. This recording button 26 is rotatably pivoted at the center portion, deviated in the counter-clockwise direction by means of a spring 27 and maintained by a stopper 28 under the state illustrated. Further, when the recording button 26 is rotated in the clockwise direction at a predetermined angle by pushing operation, this state is locked, and in this case, the movable plate 19 is moved against the spring 23 in the left direction illustrated, the head 20 and the pinch roller 21 are made into contact with the tape surface of the cassette 24 and the capstan 25, respectively, and the recording state is set. In this case, locking of the recording button 26 is released by operating a stopping button which is not illustrated.

There is provided a main switch 29 responsive to movement of the movable plate 19 in the left direction. When the switch 29 is pushed in, the electric circuit necessary for recording is driven.

There is provided a switch 30 in opposition to the side end of the crank piece 12 of the operation lever 16. The switch 30 is switched when the operation lever 18 is moved in the left direction as illustrated and connects the pickup coil 5 instead of the recording microphone 8 to the recording circuit as shown in FIG. 5.

In the construction described above, if the handset 2a of the telephone 2 is lifted, the movable plate 13 is moved by the biasing force of the spring 17 in the left direction as illustrated, and the movable plate 19 is also moved by the movement of the movable plate 13 in the left direction as illustrated. Thus, the head 20 and the pinch roller 21 are set into contact with the tape surface of the cassette 24 and the capstan 25 and set record. Further, when the movable plate 19 is moved to the left, the switch 29 is closed and the electrical circuit necessary for recording is energized, and the tape starts to rotate. At the same time, when the operation lever 16 is moved by the biasing force of the spring 17 to the left as illustrated, the switch 30 is switched to connect the pickup coil 5 instead of the recording microphone 8 to the recording circuit, thereby recording the information content of the telephone.

From this state, when the telephone call is finished and the handset 2a is placed in its cradle, the contact piece 9 and the crank piece 12 are successively rotated in the clockwise direction by the weight of the handset 2a and the movable plate 13 is moved in the right direction against the biasing force of the spring 17 through the operation lever 16. As a result, the movable plate 19 is moved to the right, the head 20 and the pinch roller 21 are separated from the tape surface of the cassette 24 and the capstan 25, respectively, and reset to the stop position. Also, the movement of the movable plate 19 opens the switch 29 to cut off the electrical circuit and at the same time, the switch 30 is switched to the recording microphone 8 by the movement of the operation lever 16 in the right direction.

Next, when the recording button 26 is pushed and locked by rotation in the clockwise direction at a predetermined angle, the movable plate 19 is moved against the spring 23 to the left as illustrated, the head 20 and the pinch roller 21 are brought into contact the tape surface of the cassette 24 and the capstan 25, respectively, and set into the recording state. Also, the switch 29 is closed in response to the leftward movement of the movable plate 19, the electrical circuit necessary for recording is energized, and the tape starts to rotate. In this case, however, the operation lever 16 is not moved and the recording microphone 8 is still connected to the recording circuit, so that the recording can be done as well as a common tape recorder by means of the recording microphone 8.

Moreover, during recording from the recording microphone 8, if the telephone rings and the handset 2a is taken up, the movable plate 13 is moved in the left direction by the biasing force of the spring 17 and at the same time, the operation lever 16 is moved in the left direction, so that the pickup coil 5 instead of the recording microphone 8 is connected to the recording circuit by means of the switch 30 and the telephone recording is switched on.

In addition, the resetting of the recording button 26 is carried out by means of a stopping button which is not shown.

Further, with such construction, the tape recorder can be set under the recording state by taking up the receiver, and when the receiver is placed down, the recording state can be reset, so that it is possible to eliminate such disadvantage that the recording of the important telephone contents is forgotten, useless tape running by forgetting the resetting after finished the telephone and the like, and moreover, the tape can economically be used for recording without leaking the contents of the telephone. Further, the pickup coil or recording microphone is switched to the recording circuit by the switch responsive to the taking up and down of the handset, so that for instance under the state of using no telephone, this telephone recording device can independently be used as a common tape recorder by operating the recording button. Further, when using it as such tape recorder, if the telephone rings and the handset is taken up, the device is automatically switched to the telephone recording which is always preferential, so that the telephone recording has not obstacle.

Second embodiment of the present invention is shown in FIG. 8. Reference numeral 13 is a movable plate movably provided on the chassis 15 of the tape recorder body in both the directions, and the movable plate 13 is provided with a recording head 20 and a pinch roller (not shown). The movable plate 13 is deviated by the spring 17 in the left direction so as to contact the head 20 with the tape surface of the cassette 24 filled in the cassette chamber 7 and the pinch roller with the capstan (not shown), respectively for maintaining the recording state. In this case, the biasing force of the spring 17 is selected to make the pinch roller contact with the capstan with the optimum contact pressure. Further, the movable plate 13 forms a standing portion 13a at the side end portion of the spring 17, and an operation lever 16 is provided between the standing portion 13a and the other end of the crank piece 12. This operation lever 16 is constantly deviated by the biasing force of the spring 17 in the left direction, while the crank piece 12 and the contact piece 9 are rotated and deviated in the counter-clockwise direction, respectively. When the handset 2a is placed on the telephone 2, the operation lever 16 is deviated in the right direction by the rotary force in the clockwise direction of the contact piece 9 and the crank piece 12 in response to the weight of the handset 2a, further moved against the biasing force of the spring 17, and the head 20 is separated from the tape surface of the cassette 24 and the pinch roller is separated from the capstan, respectively to make them the stopping state. FIG. 8 shows this state. In this case, the weight of the handset 2a of the telephone 2 is sufficiently large enough as compared with the biasing force of the spring 17 for obtaining the optimum pinch roller pressure, so that the operation lever 16 can easily be moved by rotating the contact piece 9 and the crank piece 12.

The main switch 30 is provided in opposition to the side end of the crank piece 12 of said operation lever 16. The switch 30 is put in when the recording state, i.e., the operation lever 16 is moved in the left direction, so as to energize the electrical circuit necessary for recording.

According to such construction, when the handset 2a of the telephone 2 is taken up, the movable plate 13 is moved in the left direction by the biasing force of the spring 17, the head 20 is made into contact with the tape surface of the cassette 24 and the pinch roller is made into contact with the capstan, respectively, and the recording state is set. Further, when the operation lever 16 is moved in the left direction by the biasing force of the spring 17 and the main switch 30 is put in, the electrical circuit necessary for recording is energized and the tape starts to rotate. As a result, the contents of the telephone can be recorded.

When the telephone is finished and the handset 2a is placed from this state, the contact piece 9 and the crank piece 12 are rotated in the clockwise direction by the weight of the handset 2a and the movable plate 13 is moved in the right direction against the biasing force of the spring 17 through the operation lever 16. Thus, the head 20 and the pinch roller are separated from the tape surface of the cassette 24 and the capstan, respectively, and reset under the stopping state. Further, the switch 30 is opened by movement of the operation lever 16 in the right direction, so that the electrical circuit is cut-off.

Figure 9:
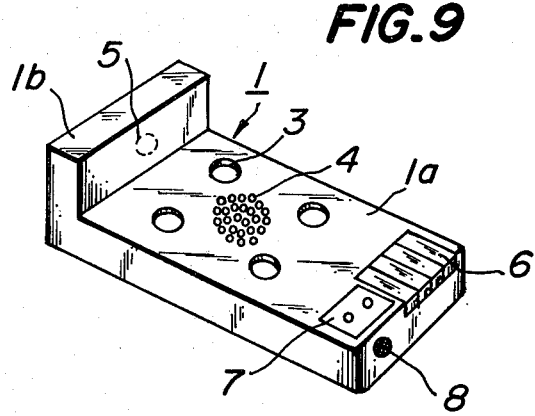
FIG. 9 shows third embodiment of the present invention.
Figure 10A:
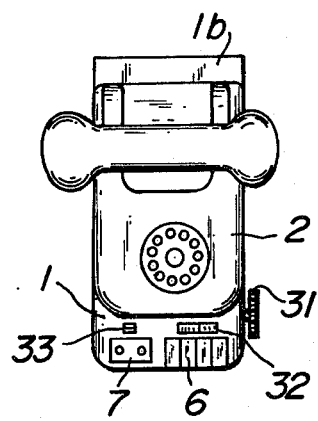
Figure 10B:
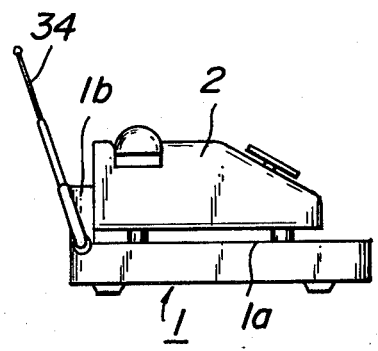

Third and fourth embodiments of the present invention are shown in FIGS. 9 to 11. Reference numeral 1 is a thinly formed tape recorder case which upper surface is made flat to form a platform portion 1a of a telephone 2. The platform portion 1a is provided with recesses 3 corresponding to legs of the telephone as shown in FIGS. 9 and 11 and apertures 4 for a speaker. One end portion of the case 1 is slightly extended in front of the telephone 2, and in the extended portion are arranged tape recorder operation buttons 6, a cassette cartridge 7 and a recording microphone 8, and further arranged a radio tuning knob 31 and a tuning dial 32 and a switch 33 for switching a radio to a tape recorder. The other end portion of the case 1 is formed into a standing portion 1b attached to the rear end surface of the telephone 2. The standing portion 1b is provided with a telephone pickup coil 5 at the portion of attaching to the telephone pickup coil so as to pick up the contents of a telephone.

The telephone pickup coil 5 is electrically connected to a tape recorder main body (not shown). Further, on the side surface of the standing portion 1b is provided a telescopic radio antenna 34.

With such construction a flat telephone platform portion is formed on the upper surface of a tape recorder, so that a space necessary for recording the contents of a telephone is made small as possible and limitation of the plate used can be alleviated by a large margin. Further, a telephone can be placed on the case, so that a tape recorder with a radio is not obstacle for operating a telephone. Further, on the case end portion slightly extended in front of the telephone are concentrically arranged the tape recorder operation button, the cassette tape cartridge, the recording microphone, the radio tuning knob and the tuning dial, so that the operationability is excellent and the space exclusively used as a tape recorder with a radio is made small as possible, and as a result, the space occupied on the desk becomes least. Furthermore, the radio antenna is provided at the rear portion of the case, so that the antenna can be stretched without any problem, thereby receiving a radio wave under a constantly good condition.

Fifth embodiment of the present invention is shown in FIGS. 12 to 14. Reference numeral 1 is a thinly formed tape recorder case which upper surface is made flat to form a platform portion 1a of a telephone 2. The platform portion 1a, as shown in FIG. 12, is formed with recesses 3 corresponding to legs of the telephone and apertures 4 for a speaker. One end portion of the case 1 is slightly extended in front of the telephone 2, the extended portion are provided with tape recorder operation buttons 6, a cassette cartridge 7, a recording microphone 8, a tuning knob 31, a tuning dial 32 and a switch 33 for switching a radio to a tape recorder and vice versa. Further, the other end portion of the case 1 is formed with a standing portion 1b attached to the rear end surface of the telephone 2. The standing portion 1b is provided with a telephone pickup coil 5 at the portion attached to the telephone so as to pick up the contents of a telephone. The telephone pickup coil 5 is electrically connected to a tape recorder main body (not shown).

Further, the standing portion 1b is provided with a radio receiving ferrite antenna 35.

On the other hand, the case 1 is rotatable by a rotation mechanism shown in FIG. 14. That is, the case 1 is secured to a rotary plate 41 through a supporting leg 42. The rotary plate 41 is rotatably supported by a shaft 39a of a rotary base stand 39. In this case, in order to make rotation of the rotary plate 41 smooth, a ball 40 is interposed between the base stand 39 and the plate 41. Further, the stand 39 forms a projection wall 39b along the periphery and a recess groove 38 is formed along the outer peripheral surface of the projection wall 39b. On the side wall of the case 1 is screwed a knob 36, the end of the knob 36 is threaded into the recess groove 38 of the stand 39, if necessary, and the rotation of the case can be stopped. In addition, the stand 39 is provided with a leg 37 for preventing the case 1 from slipping off.

According to the above constructions, since the flat telephone platform portion is formed on the upper surface of the tape recorder case for simultaneously using as a telephone stand, a space necessary for telephone recording can be limited to the least, thereby aleviating the space used by a large margin. Further, the telephone is placed on the tape recorder case, so that the tape recorder does not become an obstacle for operating the telephone. Further, the case becomes rotatable by the rotation mechanism, so that one telephone can conveniently be used from various direction in common. Thus, the telephone stand becomes excellent in function. Further, as described in the above embodiment, there is provided a ferrite antenna having directionability as a radio, so that the case can be rotated in accordance with the direction of a radio broadcasting station and fixed at the proper position, and as a result, a radio can be listened under the best condition.

The present invention is not limited to the above embodiments and can be modified within the range of the invention. For instance, in the above described embodiments, the content of the telephone is taken out of the telephone pickup, but the content of the telephone can be taken out of a telephone line directly.

What is claimed is:

1. For a telephone having a handset and a switchhook operable by the handset, a telephone answering set for use with a recording medium comprising:
   a housing for receiving a telephone set,
   a lever projecting from the housing into the area of the switchhook for movement in one direction when the handset goes off hook and another direction when the handset goes on hook,
   pickup means in the housing for sensing messages passing through the telephone,
   recording head means in the housing for recording on a recording medium,
   roller means engageable with a recording medium for advancing the recording medium,
   a switch coupled to the record head means for activating and deactivating the operation of said recording head means,
   mechanical means having a plate and linking means coupled to the lever and said roller means as well as to said head means and engageable with said switch for moving said head means and said roller means into engagement with the recording medium in response to movement of said lever and for operating the switch so as to activate said pickup means.

2. A set as in claim 1 further comprising a control contact engageable with said mechanical means for energizing the set.

3. A set as in claim 1 wherein the linkage means includes a vertical arm, a horizontal arm and a rocking lever connecting the arms, the vertical arm being connected to the lever which serves to be moved by the handset and the horizontal arm being connected to the plate.

4. A set as in claim 1, wherein said housing includes a hollow base portion for receiving the bottom of the telephone set and a hollow vertical portion for alignment with the rear of the telephone set, said recording head means, said roller means, said switch means and said plate being located in the base portion, said base portion forming the only casing for said recording head means, said roller means, said switch and said plate, said base portion having a vertical dimension smaller than its horizontal dimension.

5. A set as in claim 1, wherein said roller means and sad head means are mounted on said plate.

6. A set as in claim 5, wherein the linkage means includes a vertical arm, a horizontal arm and a rocking lever connecting the arms, the vertical arm being connected to the lever which serves to be moved by the handset and the horizontal arm being connected to the plate.

7. A set as in claim 5, wherein said plate is engageable with said switch.

8. A set as in claim 7, wherein said housing inlcudes a hollow base portion for receiving the bottom of the telephone set and a hollow vertical portion for alignment with the rear of the telephone set, said recording head means, said roller means, said switch means and said plate being located in the base portion, said base portion forming the only casing for said recording head means, said roller means, said switch and said plate, said base portion having a vertical dimension smaller than its horizontal dimension.

* * * * *